United States Patent
Yang

(10) Patent No.: US 8,888,618 B2
(45) Date of Patent: Nov. 18, 2014

(54) CONTINUOUS VARIABLE TRANSMISSION DEVICE WITH HIGH SHIFT TRANSMISSION PULLEY TRAIN

(76) Inventor: Tai-Her Yang, Dzan-Hwa (TW)

( * ) Notice: Subject to any disclaimer, the term of this patent is extended or adjusted under 35 U.S.C. 154(b) by 1159 days.

(21) Appl. No.: 12/320,387

(22) Filed: Jan. 26, 2009

(65) Prior Publication Data

US 2009/0197715 A1     Aug. 6, 2009

Related U.S. Application Data

(60) Provisional application No. 61/006,830, filed on Feb. 1, 2008.

(51) Int. Cl.
| F16H 7/00  | (2006.01) |
| F16H 9/00  | (2006.01) |
| F16H 59/00 | (2006.01) |
| F16H 61/00 | (2006.01) |
| F16H 63/00 | (2006.01) |
| F16H 37/02 | (2006.01) |
| F16H 9/16  | (2006.01) |

(52) U.S. Cl.
CPC .......... *F16H 37/02* (2013.01); *F16H 2009/166* (2013.01)

USPC .................................. 474/58; 474/70; 474/73

(58) Field of Classification Search
USPC ...................................... 474/58, 60, 70, 73, 76
See application file for complete search history.

(56) References Cited

U.S. PATENT DOCUMENTS

| 2,463,100 A * | 3/1949 | Gredell ........................... 474/70 |
| 2,694,937 A * | 11/1954 | Birbaum ..................... 74/336 R |
| 2,809,535 A * | 10/1957 | Hein et al. ...................... 477/12 |
| 3,916,020 A * | 10/1975 | Malphettes et al. ......... 261/72.1 |
| 5,173,084 A * | 12/1992 | Lemieux ........................... 474/8 |
| 5,720,686 A * | 2/1998 | Yan et al. ..................... 475/211 |
| 2002/0058559 A1 * | 5/2002 | Serkh ............................ 474/100 |

* cited by examiner

*Primary Examiner* — Henry Liu
(74) *Attorney, Agent, or Firm* — Bacon & Thomas, PLLC

(57) ABSTRACT

The invention is innovatingly disclosed to install a high shift transmission pulley train attaching with a clutching device between the input shaft and the output shaft of a continuous variable transmission device in the same revolving directions, wherein when rotational speed of the output shaft reaches or exceeds setting rotational speed, the clutching device is closed to connect the driven pulley of the high shift transmission pulley train and the output shaft.

16 Claims, 5 Drawing Sheets

CONTINUOUS VARIABLE TRANSMISSION DEVICE WITH HIGH SHIFT TRANSMISSION PULLEY TRAIN

BACKGROUND OF THE INVENTION (a) Field of the Invention

The operation schemes of continuous transmission for various known continuous variable transmission devices of different shafts type include:

The spacing between the variable spacing transmission V-belt grooves of driving and driven pulleys is modulated, whereby the operative belt transmission radial distance of driving pulley or driven pulley is changed to further change the transmission speed ratio between the driving pulley and the driven pulley;

The above said spacing modulation for variable spacing transmission V-belt grooves of driving or driven pulleys of the continuous variable transmission device is required to be driven by one or more than one kinds of axial driving forces including:

1. Through a variable centrifugal force generation mechanism by changes of the rotational speed of the input shaft to generate a variable axial driving force whereby to change the spacing of the transmission V-belt grooves of the driving pulley;
2. Through a variable centrifugal force generating mechanism by changes of the rotational speed of the output shaft to generate a variable axial driving force whereby to change the spacing of the transmission V-belt grooves of the driven pulley;
3. Through a variable axial driving force generating mechanism by changes of the output shaft torque to generate a variable axial driving force whereby to change the spacing of the transmission V-belt grooves of the driving pulley;
4. Through a variable axial driving force generating mechanism by changes of the output shaft torque to generate a variable axial driving force whereby to change the spacing of the transmission V-belt grooves of the driven pulley;
5. The driving or driven pulley is provided an axial pre-pressed spring, whereby the driving or driven pulley is pulled by the belt type transmission component to generate an axial driving force, whereby to change the variable spacing of the transmission V-belt grooves of both or either of the driving or driving pulley;

The above said 1~5 methods are passive operations of continuous variable transmission function.

6. A linear driving force actively generated manually, or by mechanical power, electromagnetic effect, hydraulically or pneumatically driven linear driving device; or a revolving kinetic energy generated by driving the electric motor, hydraulic motor or pneumatic motor is converted through a mechanical transmission device to an axial linear type driving force whereby to further change the spacing of variable spacing transmission V-belt grooves of both or either of the driving pulley or driven pulley. Said method is the active operation of continuous variable transmission.

(b) Description of the Prior Art

Types of conventional continuous variable transmission devices of different input and output shafts structures are numerous including: rubber belt type, metal belt type, chain type, or electronic (ECVT) type, friction disk type or known continuous variable transmission device of different shafts type, etc.

SUMMARY OF THE INVENTION

The continuous variable transmission device with high shift transmission pulley train is passively operated by an axial driving force generated by operating torque or its rotational speed is controlled manually or by axially pre-pressed springs on the driving and driven pulleys, or actively operated by manual, electric, mechanical, hydraulic or pneumatic powers and further referring to input preset operating modes, detected speeds and torques, etc. thereby to modulate and operate the speed ratio of the continuous variable transmission thereof.

Although the continuous variable transmission device of different shafts type is advantageous in convenient operation for its automatic speed ratio adjustment function according to the rotational speed change of the driving pulley input shaft and the size of loading torque at loading side, said continuous variable transmission device of different shafts type has the imperfections:

1. Due to low transmittable power, it is only suitable for middle to small power applications.
2. Transmission efficiency of the continuous variable transmission device of different shafts type is too low;
3. Durability enhancement is required.

The invented continuous variable transmission device with high shift transmission pulley train is innovatingly disclosed by that a high shift transmission pulley train with fixed speed ratio in the same revolving direction and an attached clutching device are installed between the input shaft and output shaft of a continuous variable transmission device, wherein if a decelerating type continuous variable transmission device is used to operated at minimum decelerating speed ratio or near minimum decelerating speed ratio status, or an accelerating type continuous variable transmission device is used to operate at maximum accelerating speed ratio or near maximum accelerating speed ratio status, whereby when the rotational speed of the output shaft reaches or exceeds the setting speed, the clutching device is operated to close so as to connect with the driven pulley of the high shift transmission pulley train and the output shaft.

DESCRIPTION OF MAIN COMPONENT SYMBOLS

Figure 1:
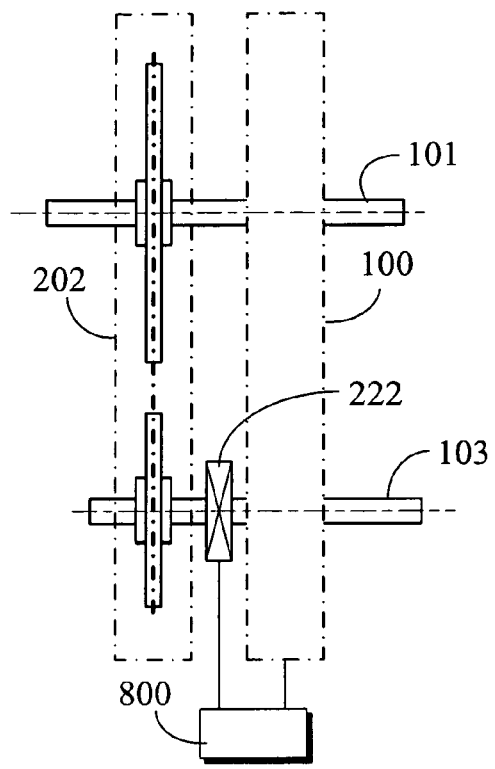
FIG. 1 is a structural schematic view of the invention showing that a continuous variable transmission device of different shafts type and a high shift transmission pulley train are installed, and a clutching device is installed between the driven pulley of the high shift transmission pulley train and the driven pulley of continuous variable transmission device of different shafts type.

100: Continuous variable transmission device of different shafts type
101: Input shaft
103: Output shaft
202: High shift transmission pulley train
211: Unidirectional transmission device
212: Torque limiting clutching device
222: Clutching device
302, 402: Speed change pulley train
800: Driving control device

DETAILED DESCRIPTION OF THE PREFERRED EMBODIMENTS

The continuous variable transmission device with high shift transmission pulley train is passively operated by an axial driving force generated by operating torque or rotational speed controlled manually or by axially pre-pressed springs on the driving and driven pulleys, or actively operated by manual, electric, mechanical, hydraulic or pneumatic powers and further referring to input preset operating modes, detected speeds and torques, etc. thereby to modulate and operate the speed ratio of the continuous variable transmission thereof.

Although the continuous variable transmission device of different shafts type is advantageous in convenient operation for its automatic speed ratio adjustment function according to the rotational speed change of the driving pulley input shaft and the size of loading torque at loading side, said continuous variable transmission device of different shafts type has the imperfections:

1. Due to low transmittable power, it is only suitable for middle to small power applications;
2. Transmission efficiency of the continuous variable transmission device of different shafts type is too low;
3. Durability enhancement is required.

The invented continuous variable transmission device with high shift transmission pulley train is innovatingly disclosed by that a high shift transmission pulley train with fixed speed ratio in the same revolving direction and an attached clutching device are installed between the input shaft and output shaft of a continuous variable transmission device, wherein if a decelerating type continuous variable transmission device is used to operated at minimum decelerating speed ratio or near minimum decelerating speed ratio status, or an accelerating type continuous variable transmission device is used to operate at maximum accelerating speed ratio or near maximum accelerating speed ratio status, whereby when the rotational speed of the output shaft reaches or exceeds the setting speed, the clutching device is operated to close so as to connect with the driven pulley and output shaft of the high shift transmission pulley train.

The continuous variable transmission device with high shift transmission pulley train comprises:

As shown in FIG. 1, besides the relevant mechanisms in the conventional continuous variable transmission device, the continuous variable transmission device with high shift transmission pulley train is further mainly constituted by:

A continuous variable transmission device of different shafts type 100: It is a continuous variable transmission device of different input and output shafts structure comprises at least one kind of rubber belt type, metal belt type, chain type, or electronic (ECVT) type, friction disk type continuous variable transmission devices, wherein transmission speed ratio thereof can be either passively automatically modulated by following torque or following rotational speed; or actively modulated by applying a linear driving force either generated by an externally powered linear driving device or by a revolving driving device via mechanical transmission for conversion to change spacing between the transmission V-belt grooves of both or either of driving and driven pulleys.

Figure 2:
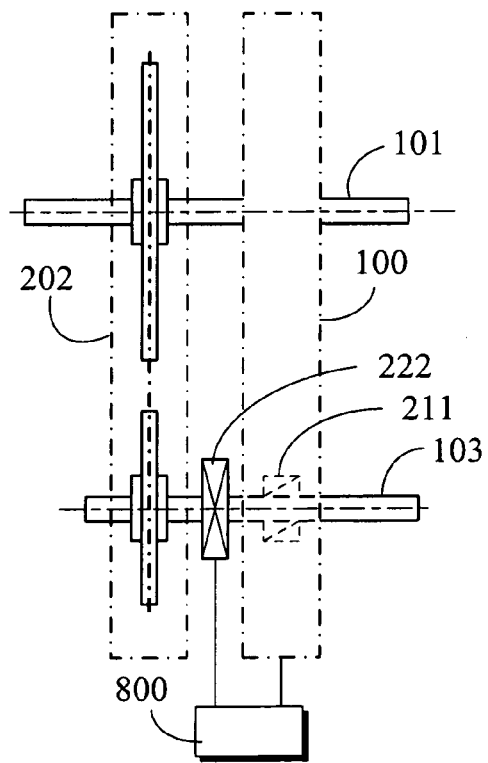
FIG. 2 is a structural schematic view of the invention showing that an unidirectional transmission device is further installed between the output shaft and the driven pulley of a continuous variable transmission device of different shafts type and a clutching device is installed between the driven pulley of the high shift transmission pulley train and the output shaft which is driven by the driven pulley of the continuous variable transmission device of different shafts type.
Figure 3:
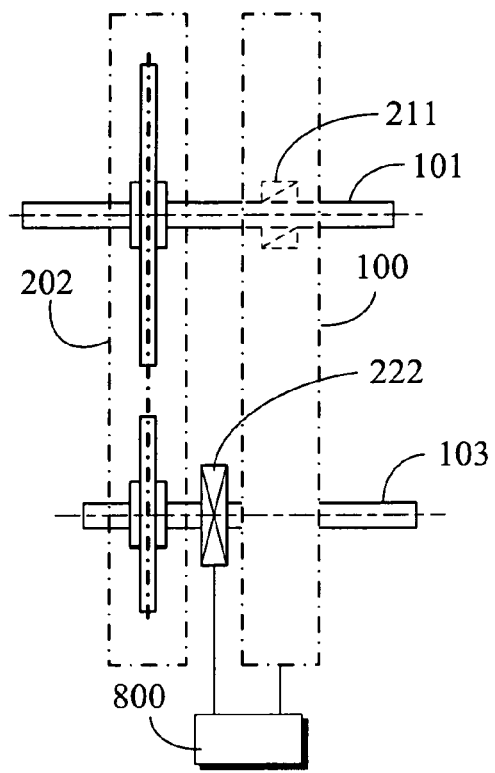
FIG. 3 is a structural schematic view of the invention showing that an unidirectional transmission device is installed between the input shaft and the driving pulley of the continuous variable transmission device of different shafts type, and a clutching device is installed between the driven pulley of the high shift transmission pulley train and the output shaft which is driven by the driven pulley of the continuous variable transmission device of different shafts type.

An input shaft 101: It is the rotating shaft to receive a revolving kinetic energy input, whereby said revolving kinetic energy is transmitted to the driving pulley of the continuous variable transmission device of different shafts type 100 and to the driving pulley of the high shift transmission pulley train 202;

An output shaft 103: it is the rotating shaft to supply revolving kinetic energy output for driving the load, whereby the revolving kinetic energy is transmitted from the driven pulley of the continuous variable transmission device of different shafts type 100, or transmitted from the driven pulley of the high shift transmission pulley train 202 through the clutching device 222 to drive the load;

An unidirectional transmission device 211: It is constituted by an unidirectional bearing, or a unidirectional clutch or a mechanism or device with unidirectional transmission function, etc. of radial or axial structures to be installed between the input shaft 103 and the driven pulley of the continuous variable transmission device of different shafts type 100 (as shown in FIG. 2), or installed between the driving pulley of the continuous variable transmission device of different shafts type 100 and the input shaft 101 (as shown in FIG. 3), wherein when the rotational speed of the driven pulley of the continuous variable transmission device of different shafts type 100 is higher than that of the output shaft 103 in the same revolving direction, the kinetic energy is transmitted through the driven pulley of the continuous variable transmission device of different shafts type 100 to drive the output shaft 103 for output. When the rotational speed of the output shaft 103 is raised to or over the setting rotational speed, the clutching device 222 is closed to connect the driven pulley of the high shift transmission pulley train 202 and the output shaft 103, if rotational speed of the output shaft 103 is higher than that of the driven pulley of the continuous variable transmission device of different shafts type 100, the unidirectional transmission device 211 is in no load operation. Further, if said unidirectional transmission device 211 is installed between the driving pulley of continuous variable transmission device of different shafts type 100 and the input shaft 101 as shown in FIG. 3, when rotational speed of the output shaft 103 is raised to or over setting rotational speed, the clutching device 222 is closed to connect the driven pulley 202 of the high shift transmission pulley train 202 and the output shaft 103, if the rotational speed of the driving pulley of the continuous variable transmission device of different shafts type 100 is higher than that of the input shaft 101 in the same revolving direction, said unidirectional transmission device 211 is also in no load operation. Herein, said unidirectional transmission device 211 can be selected to be installed or not to be installed.

Figure 4:
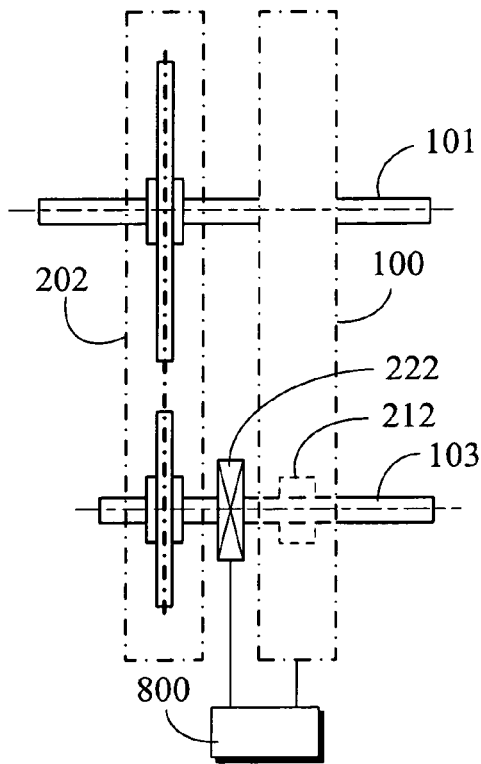
FIG. 4 is a structural schematic view of the invention showing that a torque limiting clutching device is further installed between the input shaft and the driven pulley of the continuous variable transmission device of different shafts type, and a clutching device is installed between the driven pulley of the high shift transmission pulley train and the output shaft which is driven by the driven pulley of the continuous variable transmission device of different shafts type.
Figure 5:
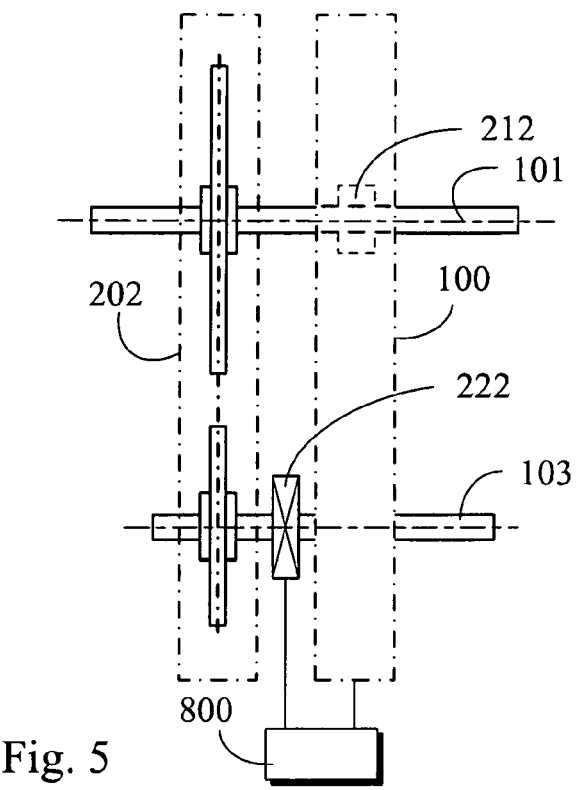
FIG. 5 is a structural schematic view of the invention showing that a torque limiting clutching device is further installed between the input shaft and the driving pulley of a continuous variable transmission device of different shafts type, and a clutching device is installed between the driven pulley of the high shift transmission pulley train and the output shaft which is driven by the driven pulley of a continuous variable transmission device of different shafts type.

A torque limiting clutching device 212: It is constituted by a sliding type or clutching type torque limiting device in radial or axial direction for replacing the unidirectional transmission device 211 to be installed between the driven pulley of the continuous variable transmission device of different shafts type 100 and the output shaft 103 (as shown in FIG. 4), or to be installed between the driving pulley of the continuous variable transmission device of different shafts type 100 and the input shaft 101 (as in FIG. 5), whereby when rotational speed of the output shaft 103 is raised to or over the setting speed, the clutching device 222 is closed, and when there is a rotational speed difference causing the torque difference to exceed its setting value between the output shaft 103 and the driven pulley of the continuous variable transmission device of different shafts type 100, or between the input shaft 101 and the driving pulley of the continuous variable transmission device of different shafts type 100, said torque limiting clutching device 212 is slid or released; wherein said torque limiting clutching device 212 can be selected to be installed or not to be installed.

Figure 6:
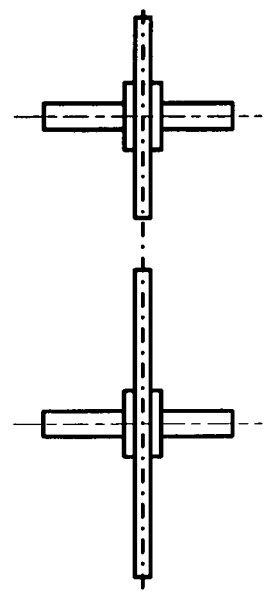
FIG. 6 is a structural schematic view showing that the high shift transmission pulley train of the invention is constituted by a driving chain pulley, a driven chain pulley and a transmission chain.
Figure 7:
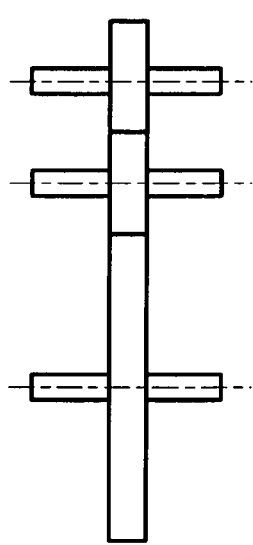
FIG. 7 is a structural schematic view showing that the high shift transmission pulley train is constituted by a driving pulley, a middle driven pulley and a pulley.
Figure 8:
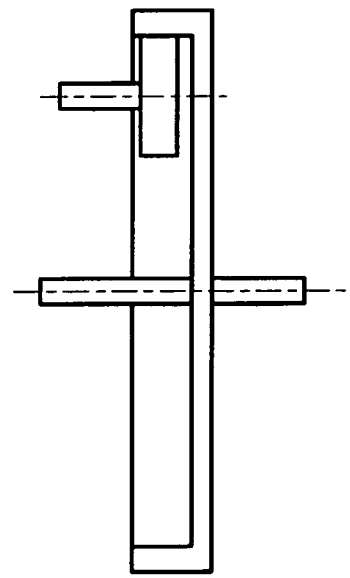
FIG. 8 is a structural schematic view showing that the high shift transmission pulley train is constituted by a smaller outer diameter transmission pulley and a larger outer diameter inner transmission pulley.
Figure 9:
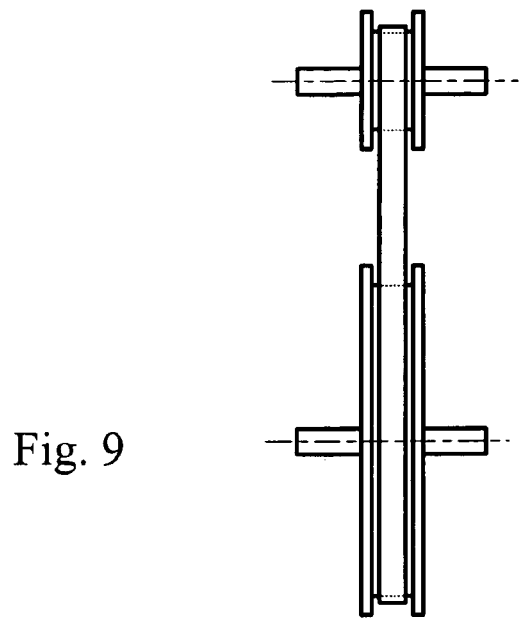
FIG. 9 is a structural schematic view showing that the high shift transmission pulley train is constituted by a driving belt pulley, a driven belt pulley and a transmission belt.

The high shift transmission pulley train 202: It comprises a driving pulley driven by input shaft 101 and a driven pulley for driving output shaft 103, wherein said driving pulley and driven pulley are transmitted in the same rotational directions, the transmission speed ratio thereof appears a high shift transmission function in accelerating transmission relative to the continuous variable transmission device of different shafts type 100, wherein the speed ratio relationship between the high shift transmission pulley train 202 and the continuous variable transmission device of different shafts type 100 is:

1. Speed ratio of the driving pulley to drive the driven pulley of the high shift transmission pulley train 202≥speed ratio of the continuous variable transmission device of different shafts type 100 in high speed output;

2. Speed ratio of the continuous variable transmission device of different shafts type 100 in high speed output>Speed ratio of the driving pulley to drive the driven pulley of the high shift transmission pulley train 202>speed ratio of the continuous variable transmission device of different shafts type 100 in low speed output;

High shift transmission pulley train 202 is constituted by the following:

1. It is constituted by a driving chain pulley, a driven chain pulley, and an attached transmission chain, wherein FIG. 6 is a structural schematic view showing that the high shift transmission pulley train 202 of the invention is constituted by a driving chain pulley, a driven chain pulley and an attached transmission chain; or 2. It is constituted by a driving pulley, a middle driven pulley and a driven pulley, wherein said driving pulley, middle driven pulley and driven pulley include constitutions by gears or friction pulleys. FIG. 7 is a structural schematic view showing that the high shift transmission pulley train 202 is constituted by a driving pulley, a middle driven pulley and a driven pulley; or 3. It is constituted by an inner gear train or an inner friction pulley train comprising a smaller outer diameter transmission pulley and a larger outer diameter inner transmission pulley. FIG. 8 is a structural schematic view showing that the high shift transmission pulley train 202 is constituted by a smaller outer diameter transmission pulley and a larger outer diameter inner transmission pulley; or 4. It is constituted by a driving belt pulley, a driven belt pulley and an attached transmission belt such as a canvas belt, a steel belt, or a chain belt. FIG. 9 is a structural schematic view showing that the high shift transmission pulley train 202 is constituted by a driving belt pulley, a driven belt pulley and a transmission belt.

The clutching device 222: It is optionally selected as needed to be constituted by 1) passively operated centrifugal type clutches by centrifugal force or torque operated type passive clutches, or 2) clutches actively operated by manual or mechanical power, or driven by electromagnetic or hydraulic or pneumatic pressure to be actively randomly controlled manually or controlled by a built-in or externally installed rotational speed detector device or torque detector device, whereby the detected signals are processed by the driving control device 800 to actively control the clutching device 222 for releasing or closing operations. Clutching device 222 is for installing between the driven pulley of the high shift continuous variable transmission device 202 and the output shaft 103, wherein it can be an independent structure or to integrate with a continuous variable transmission device of different shafts type 100, or a high shift transmission pulley train 222, a continuous variable transmission device of different shafts type 100 and a clutching device 222 can be integrated, thereby to close for kinetic energy transmission or to release for cutting off kinetic energy transmission.

A driving control device 800: It is installed according to characteristics of selected continuous variable transmission device of different shafts type 100 and clutching device 222. Said driving control device is provided with a driving power source including electric power supply unit, hydraulic oil pressure supply unit, or pneumatic pressure supply unit as well as relevant electric power control unit, hydraulic oil pressure control unit, or pneumatic pressure control unit to control speed ratio of the continuous variable transmission device of different shafts type 100 and the closing or release operating function of the clutching device 222;

If the continuous variable transmission device of different shafts type 100 is selectively passively operated by the automatic torque following transmission speed ratio modulating structure or by the rotational speed following speed ratio modulating structure, or a centrifugal type clutching device or a torque operated type passive clutching device 222 is also further used for passive controlled operation, said driving control device 800 can be not installed;

If an active controlled type clutching device is selected for the clutching device 222, or an actively operated continuous variable transmission device requiring an external driving power source for speed ratio modulation is selected for the continuous variable transmission device of different shafts type 100, a driving control device 800 shall be installed to actively control the speed ratio of the continuous variable transmission device of different shafts type 100 which requires an external driving power for speed ratio modulation, or to control the active operating type clutching device 222 for closing or releasing functions whereof.

The continuous variable transmission device with high shift transmission pulley train constituted by above said main structures comprises that the driving pulley of the high shift transmission pulley train 202 is further installed on the input shaft 101 of the continuous variable transmission device of different shafts type 100, and a clutching device 222 is installed between the driven pulley of the high shift transmission pulley train 202 and the output shaft 103 driven by the driven pulley of the continuous variable transmission device of different shafts type 100, so that when the rotational speed of output shaft 103 is raised to or over setting rotational speed, the clutching device is closed to transmit revolving kinetic energy. Further, an unidirectional transmission device 211 can be optionally installed as needed between the output shaft 103 and the driven pulley of the continuous variable transmission device of different shafts type 100, or between the driving pulley of the high shift transmission pulley train 202 and the input shaft 101, or a torque limiting clutching device 212 can be optionally selected as needed to replace said unidirectional transmission device 211;

Regarding installation of said unidirectional transmission device 211, transmission direction of said unidirectional transmission device 211 shall allow said unidirectional transmission device 211 to appear no load operation when the rotational speed of the input shaft 103 is higher than that of the driven pulley of the continuous variable transmission device of different shafts type 100 in the same revolving directions, or when the rotational speed of the driving pulley of the high shift transmission pulley train 202 is higher than that of the input shaft 101 in the same revolving directions;

If a torque limiting clutching device 212 is installed to replace said unidirectional transmission device 211, when the rotational speed of the driving pulley of the high shift transmission pulley train 202 is higher than that of the input shaft 101 in the same revolving direction, said torque limiting clutching device 212 is slid or released, and then revolving kinetic energy is transmitted by the driven pulley of high shift transmission pulley train 202 through the clutching device 222 to drive the output shaft 103 to further drive the load;

For the continuous variable transmission device of different shafts type 100 of said continuous variable transmission device with high shift transmission pulley train, if a decelerating type continuous variable transmission device is used to operate at minimum speed ratio or near minimum speed status, or an accelerating type continuous variable transmission device is used to operate at maximum accelerating speed ratio or near maximum speed ratio status, when rotational speed of the output shaft 103 is raised to or over setting rotational speed, the clutching device 222 is closed to connect the driven pulley of high shift transmission pulley train 202 and the output shaft 103, at the moment, the driven pulley of high shift transmission pulley train 202 is through the clutching device 222 to drive the rotational speed of the output shaft 103 to higher or equal to that of the driven pulley of the continuous variable transmission device of different shafts type 100 to drive the load. At said status, it is characterized in that the power originally transmitted through the continuous variable transmission device of different shafts type 100 is changed to be transmitted through the high shift transmission pulley train 202 and the clutching device 222 to drive the output shaft 103 to further drive the load. When the output shaft 103 is decelerated to below setting rotational speed, the clutching device 222 is released, the revolving kinetic energy from the input shaft 101 is then transmitted through the continuous variable transmission device of different shafts type 100 to drive the output shaft 103 and further to drive the load.

Figure 10:
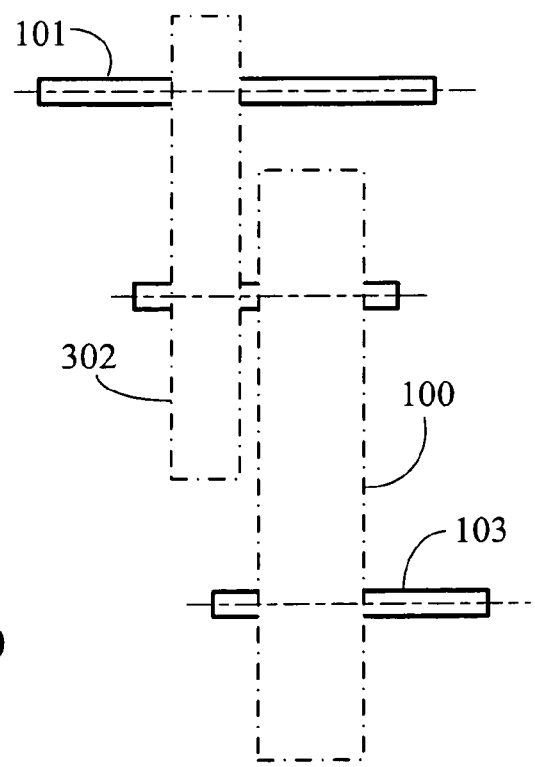
FIG. 10 is a structural schematic view of the invention showing that a speed change pulley train is installed between the input shaft and the driving pulley of a continuous variable transmission device of different shafts type.
Figure 11:
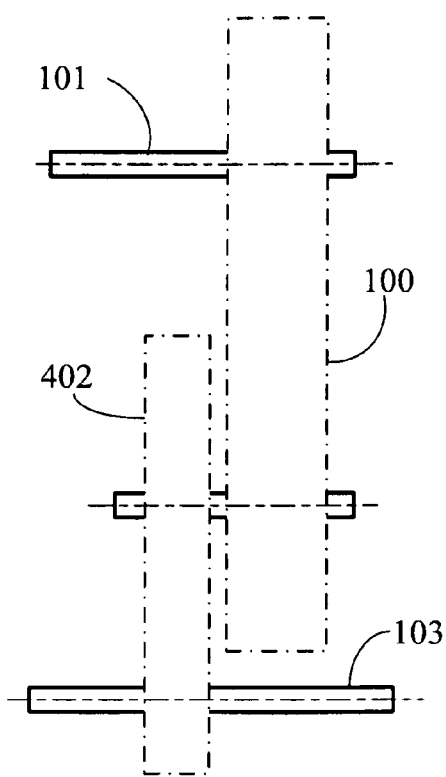
FIG. 11 is a structural schematic view of the invention showing that a speed change pulley train is installed between the output shaft and the driven pulley of the continuous variable transmission device of different shafts type.
Figure 12:
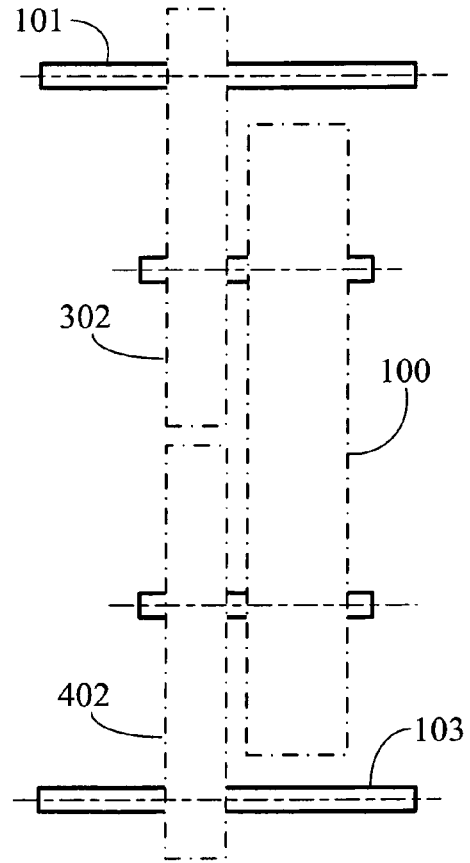
FIG. 12 is a structural schematic view of the invention showing that speed change pulley trains are installed between the input shaft and the driving pulley of the continuous variable transmission device of different shafts type and between the output shaft and the driven pulley of the continuous variable transmission device of different shafts type.

For sake of efficiency, when diameters of the driving pulley and the driven pulley are made more similar to each other to ensure a better efficiency in the continuous variable transmission of different shafts type 100 of said continuous variable transmission device with high shift transmission pulley train, a middle transmission pulley for accelerating speed ratio or decelerating speed ratio can be installed to satisfy the needs for accelerating speed ratio or decelerating speed ratio in order to ensure a better transmission efficiency, wherein said middle transmission pulley includes:

1. A speed change pulley train 302 is further installed between the input shaft 101 and the driving pulley of the continuous variable transmission device of different shafts type 100 to change the total speed ratio of the input shaft 101 and the output shaft 103 and is matched to required revolving direction. FIG. 10 is a structural schematic view of the invention showing that a speed change pulley train is installed between the input shaft 101 and the driving pulley of the continuous variable transmission device of different shafts type 100; or 2. A speed change pulley train 402 is further installed between the output shaft 103 and the driven pulley of the continuous variable transmission device of different shafts type 100 to change the total speed ratio of the input shaft 101 and the output shaft 103 and is matched to required revolving direction. FIG. 11 is a structural schematic view of the invention showing that a speed change pulley train is installed between the output shaft 103 and the driven pulley of the continuous variable transmission device of different shafts type 100; or 3. The speed change pulley trains 302, 402 are simultaneously installed between the input shaft 101 and the driving pulley of the continuous variable transmission device of different shafts type 100 and between the output shaft 103 and the driven pulley of the continuous variable transmission device of different shafts type 100 to change the total speed ratio of the input shaft 101 through the continuous variable transmission device of different shafts type 100 to drive the output shaft 103 and are matched to required revolving direction. FIG. 12 is a structural schematic view of the invention showing that speed change pulley trains are installed between the input shaft 101 and the driving pulley of the continuous variable transmission device of different shafts type 100 and between the output shaft 103 and the driven pulley of the continuous variable transmission device of different shafts type 100;

The high shift transmission pulley train of said continuous variable transmission device with high shift transmission pulley train can be selected according to application requirements to include the following:

1. To be constituted by a single stage high shift transmission pulley train of fixed speed ratio;
2. To be constituted by a multi-stage type high shift variable transmission pulley train of manual shift or automatic transmission.

For said continuous variable transmission device with high shift transmission pulley train, input methods for supplying revolving kinetic energy to the input shaft 101 can be selected based on application requirements to include the following:

1. The input shaft 101 is for receiving direct revolving power source input from revolving power source such as engine, motor or generator or input from flywheel, wind power fan blades, gas or liquid turbines, or manual power, etc.;
2. The revolving power sources as said in item 1 supplied to the input shaft 101 for output is first controlled by a clutching device before providing revolving kinetic energy output;
3. The revolving power sources as said in item 1 supplied to the input shaft 101 for output is further through a speed change device with fixed speed ratio, or a stepped or stepless speed change device of manual shift or automatic transmission, or a fluid transmission device, or an electromagnetic eddy current transmission device to provide revolving kinetic energy output;
4. The revolving power sources as said in item 1 supplied to the input shaft 101 for output is further through a clutching device and a speed change device with fixed speed ratio, or a stepped or stepless speed change device of manual shift or automatic transmission, or a fluid transmission device, or an electromagnetic eddy current transmission device to provide revolving kinetic energy output.

The revolving kinetic energy output from the output shaft 103 of said high shift transmission pulley train can be selected according to application requirements to include the following:

1. The revolving kinetic energy output from output shaft 103 is directly used to drive the load;
2. The revolving kinetic energy output from the output shaft 103 is through a clutching device to further drive the load;
3. The revolving kinetic energy from the output shaft 103 is through a speed change device with fixed speed ratio, or a stepless or stepped speed change device of manual shift or automatic transmission, or a fluid transmission device, or electromagnetic eddy current transmission device to further drive the load;
4. The revolving kinetic energy output from the output shaft 103 is through a clutching device and a speed change device with fixed speed ratio, or a stepless or stepped speed change transmission device of manual shift or automatic transmission, or a fluid transmission device, or an electromagnetic eddy current transmission device to further drive the load.

The practical applied structures of said continuous variable transmission device of different shafts type 100 and said high shift transmission pulley train 202 can be selectively made to independently separated mechanical devices and combined afterwards for transmission or made to an integral structure or made to a structure of a common integrated mechanical device and a common integrated casing.

As summarized from above descriptions, said continuous variable transmission device with high shift transmission pulley train is characterized in that a high shift transmission pulley train 202 is parallel connected with a continuous variable transmission device of different shafts type 100, an unidirectional transmission device 211 or torque limiting clutching device 212 is installed between the driving pulley of the continuous variable transmission device of different shafts type 100 and input shaft 101, or is installed between the driven pulley of the continuous variable transmission device of different shafts type 100 and the output shaft 103, and a clutching device 222 is further installed between the driven pulley of the high shift transmission pulley train 202 and the output shaft 103, whereby when rotational speed of the output shaft 103 is raised to setting rotating speed, said clutching device 222 is controllably operated to close, so as to allow revolving kinetic energy to be transmitted by the high shift transmission pulley train 202 to drive the output shaft 103 and to further drive the load, thereby to extend service life of said continuous variable transmission device of different shafts type 100 and to promote transmission efficiency.

The invention claimed is:

1. A continuously variable transmission with a high shift transmission pulley device, comprising:
   a continuously variable different-shaft-type transmission (CVT) device (100) having a CVT driving pulley, a CVT driven pulley, an input shaft (101), and an output shaft (103), said CVT driving pulley and CVT driven pulley having a continuously variable speed ratio; and
   a high shift transmission pulley device (102) having a fixed speed ratio and including a high shift driving pulley driven by an input shaft (101) and a high shift driven pulley connected to a clutch device (222) for selective connection to the output shaft of the continuously variable transmission device through the clutch device (222);
   a unidirectional transmission device (211) or torque limiting clutch (212) installed between the input shaft and the CVT driving pulley,
   wherein:
      when the rotational speed of the output shaft is raised to or over a predetermined rotational speed, the clutch device is closed to connect the high shift driven pulley and the output shaft, and
      when the rotational speed of the CVT driving pulley or the CVT driven pulley is higher than the rotational speed of the respective input shaft or output shaft in the same rotating direction, the unidirectional transmission device is in a no load operation, or when, as a result of a high torque due to heavy load operation, the rotational speed difference exceeds a predetermined value, the clutch device is slid or released, and
   wherein the high shift transmission pulley device is thus connected to transmit rotational kinetic energy of the input shaft to the output shaft through the clutch device (222) whenever the rotational speed of the output shaft is raised to or over a predetermined rotational speed, and released when said rotational speed is lower than the predetermined value.

2. A continuously variable transmission as claimed in claim 1, wherein when the output shaft is decelerated to below said predetermined rotational speed, the clutch device is released, and rotational kinetic energy from the input shaft is transmitted from the input shaft through the CVT device to drive a load.

3. A continuously variable transmission as claimed in claim 1, wherein when a rotational speed difference between the output shaft and the CVT driven pulley causes a torque difference to exceed a predetermined value, the clutch device is slid or released.

4. A continuously variable transmission as claimed in claim 1, further comprising a driving control device (800) for controlling the speed ratio of the continuously variable transmission device.

5. A continuously variable transmission as claimed in claim 1, wherein said continuously variable transmission device is passively controlled and does not require a driving control device (800).

6. A continuously variable transmission as claimed in claim 1, wherein a relationship between the fixed speed ratio of the high shift diving and driven pulleys and the continuously variable speed ratio is either:
   (a) said fixed speed ratio of the high shift driving pulley to the high shift driven pulley is≥said continuously variable speed ratio in high speed output, or
   (b) said continuously variable speed ratio in high speed output is>said fixed speed ratio of the high shift driving pulley to the high shift driven pulley>said continuously variable speed ratio in low speed output.

7. A continuously variable transmission as claimed in claim 1, wherein said continuously variable transmission device is one of the following types of continuously variable transmission: rubber belt, metal belt, chain, electronic (ECVT), or friction disc type of continuously variable transmission device.

8. A continuously variable transmission as claimed in claim 1, wherein the speed ratio of the continuously variable transmission device is automatically passively modulated by following torque or rotational speed.

9. A continuously variable transmission as claimed in claim 1, wherein the speed ratio of the continuously variable transmission device is actively modulated by applying a linear driving force generated by an external linear driving device or a revolving driving device via a mechanical transmission device to change a spacing between V-belt grooves of either or both of the CVT driving pulley or the CVT driven pulley.

10. A continuously variable transmission as claimed in claim 1, wherein the high shift transmission pulley device further comprises a middle transmission pulley mechanism for providing an accelerating or decelerating speed ratio, said middle transmission pulley mechanism including one of a speed change pulley train (302) installed between the input shaft and the CVT driving pulley to change a total speed ratio of the input shaft and output shaft, a speed change pulley train (402 installed between the output shaft and the CVT driven pulley to change the total speed ratio of the input shaft and output shaft, and speed change pulley trains (302,402) simultaneously installed between the input shaft and the CVT driving pulley and between the output shaft and the CVT driven pulley to change the total speed ratio of the input shaft through the CVT device to drive the output shaft.

11. A continuously variable transmission as claimed in claim 1, wherein the high shift transmission pulley device includes one of a single stage high shift transmission pulley train and a multi-stage transmission pulley train of a manual or automatic transmission.

12. A continuously variable transmission as claimed in claim 1, wherein the input shaft is connected to a power source in one of the follow ways: (a) direct connection to the power source; (b) connection to the power source through a clutch; (c) connection to the power source through a speed change device; and (d) connection to the power source through both a clutch and a speed change device.

13. A continuously variable transmission as claimed in claim 1, wherein the output shaft is connected to a load in one of the following ways: (a) direct connection to the load; (b) connection to the load through a clutch; (c) connection to the load through a speed change device; and (d) connection to the load through both a clutch and a speed change device.

14. A continuously variable transmission as claimed in claim 1, wherein said high shift transmission pulley device and CVT device are independent devices, integrated devices, or integrated devices in a common casing.

15. A continuously variable transmission as claimed in claim 1, wherein said high shift transmission pulley device includes at least one of the following structures: a transmission chain; a transmission chain; transmission gears that are in addition to the respective driving and driven pulleys; a friction pulley; a canvas belt; a steel belt; and a chain belt.

16. A continuously variable transmission as claimed in claim 1, wherein said clutch device includes one of: (a) a passive centrifugal-force or torque operated clutch; and (b) an active clutch operated driven manually, mechanically, electromagnetically, hydraulically, or pneumatically, and which is controlled by a rotational speed or torque detector or selectively manually controlled,
   wherein said clutch device is an independent structure or integrated with the continuously variable transmission device.

* * * * *